US012264048B2

(12) United States Patent
Mupende et al.

(10) Patent No.: US 12,264,048 B2
(45) Date of Patent: Apr. 1, 2025

(54) CABLE DRUM FOR A CABLE WINCH AND METHOD FOR PRODUCTION THEREOF

(71) Applicant: Liebherr-Components Biberach GmbH, Biberach an der Riss (DE)

(72) Inventors: Ilaka Mupende, Neu-Ulm (DE); Norbert Hausladen, Biberach an der Riss (DE); Bernd Hemel, Biberach an der Riss (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 220 days.

(21) Appl. No.: 17/378,500

(22) Filed: Jul. 16, 2021

(65) Prior Publication Data

US 2021/0380378 A1 Dec. 9, 2021

Related U.S. Application Data

(63) Continuation of application No. PCT/EP2019/085385, filed on Dec. 16, 2019.

(30) Foreign Application Priority Data

Jan. 16, 2019 (DE) .................... 10 2019 101 046.2

(51) Int. Cl.
*B66D 1/30* (2006.01)

(52) U.S. Cl.
CPC .................................... *B66D 1/30* (2013.01)

(58) Field of Classification Search
CPC ... B66D 1/28; B66D 1/30; B66D 1/74; B66D 3/26; B66D 2700/0183; B65H 75/14; B65H 75/44; B65H 75/2254; B65H 2701/5136
USPC ........................................................ 254/374
See application file for complete search history.

(56) References Cited

U.S. PATENT DOCUMENTS

| | | | | | |
|---|---|---|---|---|---|
| 1,613,925 | A | * | 1/1927 | Boykin, Jr. | B66D 5/023 242/909 |
| 2,148,394 | A | * | 2/1939 | Thornton | D02H 13/28 242/118.6 |
| 2,262,113 | A | * | 11/1941 | Olson, V | D02H 3/00 242/118.6 |
| 2,866,607 | A | * | 12/1958 | Ewing | D02H 13/28 242/118.6 |
| 2,990,133 | A | * | 6/1961 | Tucker, Jr. | B65H 75/14 40/309 |
| 3,235,203 | A | * | 2/1966 | Antliff | B65H 75/2245 242/610.4 |

(Continued)

FOREIGN PATENT DOCUMENTS

| | | |
|---|---|---|
| CN | 203229348 | 10/2013 |
| CN | 103496647 | 1/2014 |

(Continued)

*Primary Examiner* — Emmanuel M Marcelo
*Assistant Examiner* — Henrix Soto
(74) *Attorney, Agent, or Firm* — Levine Bagade Han LLP

(57) ABSTRACT

The present invention relates to a cable drum for a cable winch of a cable drive, having a drum shell and two flanged wheels which adjoin the drum shell at the ends, wherein the drum shell and/or the flanged wheels are produced from fiber-reinforced composite material, wherein the drum shell and/or the flanged wheels have a multi-shell structure having at least two walls made of fiber-reinforced composite material, which walls are spaced apart from each other and connected to each other by a foam core.

27 Claims, 11 Drawing Sheets

(56) References Cited

U.S. PATENT DOCUMENTS

| | | | | |
|---|---|---|---|---|
| 3,289,972 | A * | 12/1966 | Hafner | B65H 75/14 |
| 3,322,373 | A * | 5/1967 | Boyer | B65H 75/18<br>242/118.7 |
| 3,398,915 | A * | 8/1968 | Dittrich | D02H 13/28<br>242/118.7 |
| 3,452,946 | A * | 7/1969 | Starratt | B65H 75/14<br>242/118.8 |
| 4,025,675 | A * | 5/1977 | Jonda | B32B 3/12<br>428/116 |
| 4,253,569 | A * | 3/1981 | O'Connor | B65D 85/04<br>206/391 |
| 6,405,974 | B1 * | 6/2002 | Herrington | B29C 53/14<br>242/613.5 |
| 9,187,298 | B2 | 11/2015 | DeSoo et al. | |
| 2012/0104147 | A1 * | 5/2012 | Cox | B65H 75/14<br>242/614 |
| 2013/0000831 | A1 * | 1/2013 | Ripplinger | B65H 75/18<br>156/244.11 |
| 2015/0321448 | A1 * | 11/2015 | Lazzara | B32B 5/12<br>53/430 |

FOREIGN PATENT DOCUMENTS

| | | | | |
|---|---|---|---|---|
| CN | 204980984 | | 1/2016 | |
| CN | 108313908 | A * | 7/2018 | |
| CN | 113479804 | A * | 10/2021 | |
| DE | 202008004661 | | 9/2009 | |
| DE | 202011001845 | | 6/2012 | |
| DE | 102015119336 | | 1/2018 | |
| EP | 0263787 | B1 * | 6/1991 | |
| GB | 2490350 | A * | 10/2012 | B66D 1/30 |
| WO | WO 2020/148050 | | 7/2020 | |

* cited by examiner

CABLE DRUM FOR A CABLE WINCH AND METHOD FOR PRODUCTION THEREOF

CROSS-REFERENCE TO RELATED APPLICATIONS

This application is a continuation of International Patent Application Number PCT/EP2019/085385 filed Dec. 16, 2019, which claims priority to German Patent Application Number DE 10 2019 101 046.2 filed Jan. 16, 2019, the contents of which are incorporated herein by reference in their entireties.

BACKGROUND

The present invention relates to a hoist drum for a hoist winch of a rope drive having a drum jacket and two guard plates adjacent to the drum jacket at the end sides, with the drum jacket and/or the guard plates being produced from fiber reinforced composite material. The invention further relates to a method of manufacturing such a hoist drum.

Hoist winches are used in various application areas and substantially comprise three main assemblies, namely, on the one hand, the hoist drum having a drum jacket and end plates or guard plates attached to the end face and bounding the drum jacket; on the other hand, a drive transmission; and finally a winch frame at which the hoist drum is rotatably supported. Said drive transmission is here frequently accommodated in the interior of the hoist drum and can, for example, be formed as a single-stage or multi-stage planetary gear.

Such hoist winches are used, for example, for lifting equipment in machine construction and plant construction or in transfer engineering, with the hoist winches being able to serve for vertical material transport, but also as a horizontal feed drive or a slopingly inclined feed drive. The hoist winches can in this respect in particular be installed on cranes such as construction cranes, mobile cranes, or maritime cranes such as harbor cranes, ship cranes, and offshore cranes, with the hosting winches here being able to be hoist winches for winding and unwinding a hoist rope, but also guying winches for guying ropes, or feed winches, for example for traveling a trolley. Such hoist winches are furthermore likewise used for other construction machinery such as crawler-mounted cranes or as derrick winches or other maritime applications such as deep sea winches. Such winches are also used in aeronautics, for example as hoist or load winches on helicopters or airships.

Considerable compressive strains under which the hoist drum has to hold the rope packet wound on it with sufficient safety typically occur at the hoist drum due to the rope that is to be wound up under load. The rope to be wound up is here not only wound in one layer, but is rather stacked over one another on the hoist drum in a plurality of layers—also more than ten layers—with every single layer to be wound up in turn introducing compressive strains into the hoist drum tube so that the compressive strains in the drum jacket increase more and more as the number of wound layers increases in accordance with the superposition principle with a rope pull that remains the same per se.

To withstand this external pressure, the drum jacket has previously typically been produced from steel or a cast material with at times considerable wall thicknesses, in part using high strength steel such as quenched and tempered steel or grain refined steel.

Such solidly formed hoist drums of steel or cast material, however, bring about a very high weight, which is disadvantageous in weight-sensitive applications. A high hoist winch weight can be disadvantageous in the aforesaid applications for various reasons. With mobile cranes, for example, care must be taken that the permitted road transport weight or the permitted axle loads are observed. Depending on the assembly location of the hoist winch, its weight also strains the statics of a crane, for example when the hoist winch is attached to the counterboom of a revolving tower crane and has to be borne by the tower framework or the hoist winch weight can reduce the maximum payload of a hoist device, for example when the hoist winch is attached to the hoist cage of an elevator and also has to be raised.

It has already been suggested in DE 10 2015 119 336 B4 for the reduction of the hoist winch weight to provide the hoist drum with a honeycomb design in which a top jacket layer that closes the honeycomb structure is applied internally and externally to a honeycomb-shaped jacket core. The guard plates are correspondingly formed from a honeycomb core onto which top layers can be applied at the left and right. It should take place by a material-adding 3D printing process, namely by selective laser melting or laser metal deposition. Such structures produced by selective laser melting or laser metal deposition, however, are prone to cracking, brittleness, and deformation and are additionally very expensive, at least to date.

Document DE 20 2011 001 845 U1 furthermore proposes hoist winches having a plastic drum composed of a fiber reinforced plastic such as GRP or CFRP, with a friction reducing and damping surface layer being applied to the drum jacket to ensure a smooth, low-wear rope running.

It is the underlying object of the present invention to provide an improved hoist drum of the initially named kind as well as an improved method for its production to avoid the disadvantages of the prior art and to further develop the latter in an advantageous manner. A lightweight and nevertheless sufficiently stable hoist drum withstanding high rope strains should in particular be provided that is inexpensive in production.

The named object is achieved in accordance with the invention by a hoist drum in accordance with claim 1, by a hoist winch having such a hoist drum in accordance with claim 22 and by a method of producing a hoist winch in accordance with claim 23. Preferred embodiments of the invention are the subject of the dependent claims.

It is therefore proposed to produce the drum jacket and/or the guard plates from fiber reinforced composite material, with the fiber reinforced composite material being selectively used to achieve a smart structure of the drum jacket or of the guard plates.

SUMMARY

In accordance with an aspect of the invention, the drum jacket and/or the guard plates has/have a multilayer structure with at least two walls of fiber reinforced composite material that are spaced apart from one another and are connected to one another by an interposed foam core. The fiber composite walls form wear resistant, pressure stable, hard top layers that surround and protect the comparatively very much lighter and more sensitive foam core. A further weight reduction can be achieved by the comparatively smaller density of the filling foam in comparison with a solid material carcass of only fiber reinforced composite material. At the same time, the foam core and the spacing of the walls of fiber reinforced composite material hereby achieved increases the shape stability and stiffness of the drum jacket built up of multiple shells and/or of the guard plates built up of multiple shells.

In a further development of the invention, the foam core of the drum jacket and/or of the guard plates can have a wall thickness that is very much greater than the wall thickness of the top layers or walls of fiber reinforced composite material. The walls of fiber reinforced composite material can preferably each have a wall thickness that is less than 50% or less than 25%, in particular also less than 15%, of the wall thickness of the foam core. Independently of this, the wall thicknesses are coordinated with the permitted deformation of the drum jacket.

Said foam core can be formed as a solid material carcass or can substantially completely fill the intermediate space between the walls of the drum jacket and/or of the guard plates of fiber reinforced composite material. The foam core therefore does not form a honeycomb structure or a net structure having larger cutouts, with the foam core naturally being able to have the typical foam bubble or cell structure of a foam, possibly with the shrinkage cavities not to be avoided on foaming.

A closed cell hard foam can advantageously be used as the foam core, for example in the form of a polyurethane foam or a polystyrene foam or a PVC foam. The foam core can in particular be pressure foamed to have a high stiffness with a small density.

The walls of the drum jacket and/or of the guard plates of fiber reinforced composite material can in particular be produced from GRP or CFRP. The fiber reinforcement can comprise glass fibers and/or carbon fibers and/or aramid fibers, and optionally also mixtures therefrom, with the fiber reinforcement being able to be in the form of woven fiber mats and/or also nonwoven fabrics having a random, cloud-shaped fiber orientation. Alternatively or additionally, the fiber reinforcement can also consist of or comprise fiber bundles applied in a directional manner, for example wound fiber strands.

The matrix material surrounding and/or passing through the fiber reinforcement can, in a further development of the invention, be a hardenable artificial resin, for example polyester resin or epoxy resin, with which the fibers are saturated and/or impregnated and/or laminated.

In accordance with a further aspect of the present invention, the fiber reinforced part of the drum jacket and/or of the guard plates can be produced in one winding process. At least one wall of the drum jacket and/or at least one wall of the guard plates can in particular be wound, with the fiber reinforcement in the form of the aforesaid fiber fabric and/or nonwoven fabric and/or fiber strand advantageously being wound in multiple layers so that the wall of fiber reinforced composite material has a multilayer reinforcement.

The winding direction in which the fiber reinforcement material is wound can here generally be selected in different manners. In accordance with an advantageous embodiment of the invention, the fiber reinforcement material can be helically wound in at least the region of the drum jacket and/or can be arranged such that a main fiber direction winds helically about the drum axis. On a multilayer application of the fiber reinforcement material, the winding process and/or the arrangement of the fiber reinforcement can in particular be carried out such that the reinforcement fibers extend in the different winding layers in cross-coating with an oppositely directed helical pitch to achieve a particularly high strength.

It can, however, generally also be considered to arrange at least one layer of the fiber reinforcement material with a main direction of the fibers in parallel with the peripheral direction and/or in parallel with the axial alignment of the drum jacket.

To nevertheless achieve sufficient stiffness or strength with the highest possible weight reduction, the drum jacket and/or the guard plates can also be equipped in accordance with a further aspect of the invention with at least one stiffening rib that can be formed from fiber reinforced composite material and can project inwardly toward the drum center from an inner jacket surface of a jacket wall of the drum jacket and/or can project from a side of the guard plate wall in the axial direction of the drum axis. Said at least one stiffening rib can here be produced from the same fiber reinforced composite material as the jacket wall and/or the guard plate wall and can be molded integrally in one piece thereto. It can, however, alternatively also be considered to produce the stiffening fib from a different fiber reinforced composite material than the drum jacket wall and/or the guard plate wall to which said stiffening rib is attached. The stiffening rib can, for example, comprise a different fiber reinforcement material than the associated wall.

In a further development of the invention, the at least one stiffening rib can also be produced on the manufacture of the jacket wall and/or guard plate wall, in particular molded to the wall in a wet-on-wet manner, so that the matrix material of the stiffening rib hardens overlapping with the matrix material of the associated wall at least at times.

Alternatively, the stiffening rib can, however, also be subsequently attached, for example adhesively bonded and/or welded in dependence on the matrix material, to the associated jacket wall or to the associated guard plate wall.

The at least one stiffening rib can advantageously extend at the drum jacket helically along the inner jacket surface of the jacket wall and/or around the drum axis. Alternatively or additionally, however, a stiffening rib can also be provided that extends concentrically at least approximately in the peripheral direction. Alternatively or additionally, a stiffening rib that extends in the axial direction, that is approximately in parallel with the drum axis, can also be attached to the drum jacket, with a plurality of such axial stiffening ribs advantageously being arranged distributed over the periphery.

In a further development of the invention, differently contoured stiffening ribs can also be combined with one another. For example, a helical stiffening rib and/or a plurality of concentric stiffening ribs extending in the peripheral direction can also be provided in addition to a plurality of axial stiffening ribs so that individual stiffening ribs or stiffening rib sections intersect. A multiaxial stiffening can hereby be achieved.

Said stiffening ribs can also be combined with the previously named foam core, but optionally also without such a foam core.

The at least one stiffening rib can have a rib height that corresponds to a range of 50% to 300% of the wall thickness of the jacket wall or of the guard plate wall of fiber reinforced composite material. The rib width can advantageously amount to less than 10% of the total length of the drum jacket.

At least one stiffening rib can in particular also be provided in a double-shell design of the drum jacket and/or of the guard plates so that the stiffening rib extends between two walls of the two-shell structure. The stiffening rib can here be molded to at least one of the two walls or can be rigidly fastened thereto. The stiffening rib can advantageously be fastened, in particular molded, to both mutually spaced apart walls so that the two walls of the multi-shell structure are connected to one another by the stiffening rib.

The guard plates can be connected to the drum jacket body in different manners. In accordance with an advantageous further development of the invention, the guard plates can be connected integrally in one piece to the drum jacket, with the fiber reinforcement advantageously extending continuously over the connection section or transition section between the drum jacket and the guard plate to achieved a fixed and steep connection of the guard plates to the drum jacket. A transition with material homogeneity between the drum wall of fiber reinforced composite material and the guard plate wall of fiber reinforced composite material can in particular be provided.

Alternatively, the guard plates can be formed separately from the drum jacket in a further development of the invention, and can subsequently be fastened to the drum jacket or connected thereto.

In a further development of the invention, the guard plates can be set at the end face of the drum jacket, in particular pressed against the end faces of the drum jacket in a force transmitting and/or shape matching manner.

In this respect, in a further development of the invention, tie rods can be provided that are anchored in the drum jacket and that pull the guard plates toward the end faces of the drum jacket. Such tie rods can, for example, be bolts that extend through the guard plate into the drum jacket, with nuts being provided that can be screwed onto the bolts for tightening the guard plates or also with the bolts themselves being able to be screwed into the drum jacket to tighten the guard plates.

Such tie rods can be subsequently screwed into the drum jacket or can be anchored to it in a different manner, for example adhesively bonded or spread out in the manner of a dowel. The tie rods can in particular also be molded integrally in one piece, in particular material-homogeneously, to the drum jacket, for example in the form of fiber reinforced composite material tie rods that are fastened to the fiber reinforced composite material wall of the drum jacket.

Alternatively or additionally to such tie rods, the guard plates can also be tensioned against the end faces of the drum jacket via pull rods. Such pull rods can advantageously extend through the total length of the drum jacket and can pass through the guard plates at oppositely disposed ends of the drum jacket so that the pull rods tension the two guard plates toward one another and thus tension them against the end faces of the drum jacket. Such pull rods can be bolts that are provided with nuts that can be tightened on at at least one side.

Alternatively to a setting of the guard plates against the end faces of the drum jacket, the guard plates can also be pushed onto the drum jacket in the manner of a sleeve or of a cap and can be fixed in the desired manner there, for example by firmly bonding or by a shape matching and/or force transmitting holding means, for example in the form of tensile bolts and/or stud bolts.

In a further development of the invention, the drum jacket can be provided with a rope grooving at the external peripheral side, with such a rope grooving being able to be introduced directly into the jacket wall of fiber reinforced composite material so that the fiber composite material drum wall has a grooved section at the external peripheral side. The introduction of the grooving can here advantageously take place directly during the drum jacket manufacture so that a separate machining, for example in the form of a subsequent milling to produce the grooving, can be omitted.

In a further development of the invention, the grooving on the hoist drum can optionally, however, also be introduced into a top layer or jacketing that is separately applied to the drum jacket and that can simultaneously serve as wear protection.

Alternatively or additionally, the end plates can also be provided with a top layer or a wear protection layer at least at the inner side, that is on the side facing the rope winding region. Such a top layer can, for example, comprise a plastic jacketing that can, for example be vulcanized on to produce a damped rope running and advantageously small friction values with respect to the rope.

BRIEF DESCRIPTION OF THE DRAWINGS

The invention will be explained in more detail in the following with respect to preferred embodiments and to associated drawings. There are shown in the drawings.

DETAILED DESCRIPTION

Figure 1:
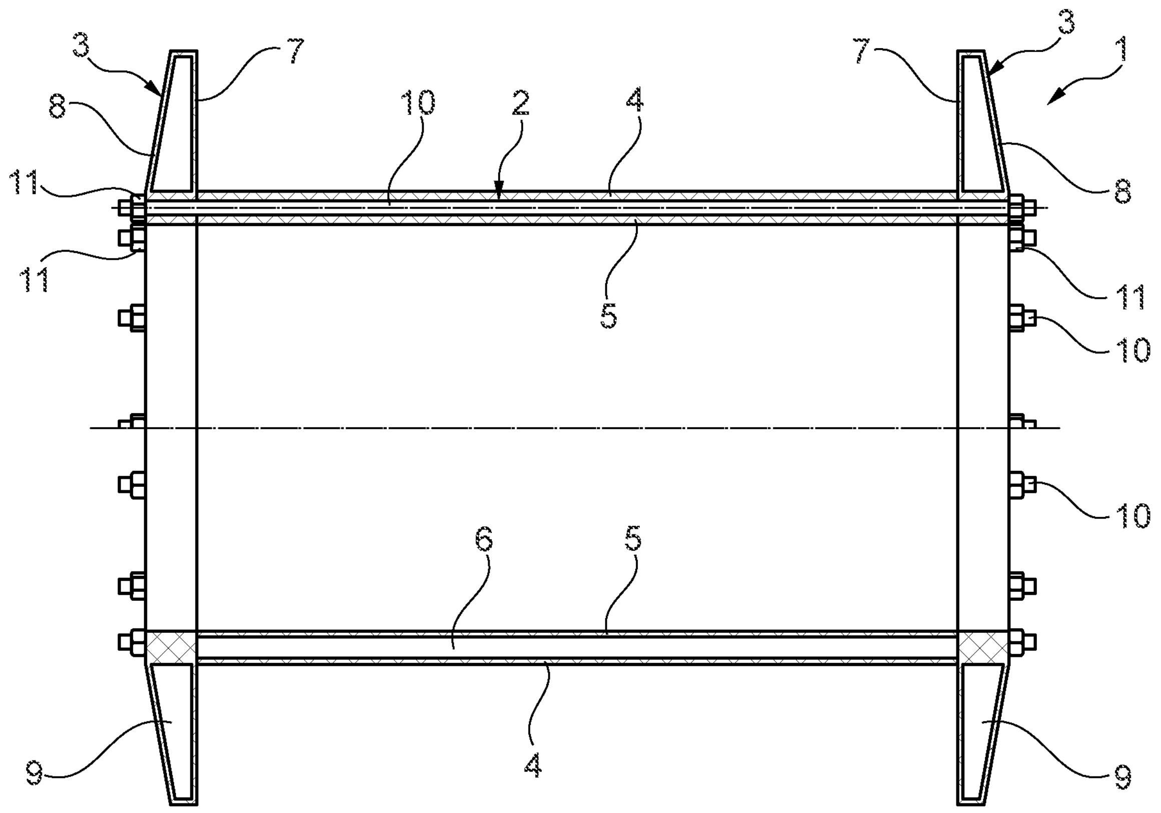
FIG. 1: a longitudinal section through a hoist drum in accordance with an advantageous embodiment of the invention in which the drum jacket and the guard plates each have a double-shell structure having a foam core and fiber composite material walls and the separately formed guard plates are connected to the drum jacket by pull rods.

The hoist drums 1 shown in the Figures respectively comprise a roughly speaking cylindrical drum jacket 2 to whose axial ends a respective guard plate 3 is connected. Said guard plates 3 extend roughly speaking perpendicular to the longitudinal drum axis and project radially outwardly from the drum jacket surface so that the guard plates 3 have a considerably greater diameter than the drum jacket 2.

The hoist drum 1 shown can in this respect in particular be used in the hoisting gear of a crane such as a revolving tower crane or a mobile telescopic crane or a boom mast adjustment gear, but also in other hoist winches.

Said guard plates 3 can generally be connected to the drum jacket body 2 in different manners, as will still be explained.

As FIG. 1 shows, the drum jacket 2 can have a multi-shell structure and have two substantially cylindrical jacket walls 4 and 5, preferably arranged coaxially, that are each produced from a fiber reinforced composite material, for example GRP or CFRP.

A foam core 6 that can likewise be at least contoured approximately cylindrically is received in a sandwich-like manner between the two jacket walls 4 and 5 of the drum jacket 2. The foam core 6 substantially completely fills the intermediate space between the two jacket walls 4 and 5 and is in areal contact with the two walls. The two jacket walls 4 and 5 of fiber reinforced composite material can in particular form top layers that cover and protect the foam core 6 at the inner and outer sides.

The foam core 6 holds the two jacket walls 4 and 5 apart and connects them to one another, with the foam core 6 being able to be connected to the two jacket walls 4 and 5 aeally, in particular over the full area, with force transmission and/or material continuity.

The foam core 6 can in particular be produced by foaming the intermediate space between the two jacket walls 4 and 5 so that the foam core 6 lies under pressure against the material walls 4 and 5 and enters into a connection therewith.

As FIG. 1 shows, the guard plates 3 can also have a multi-shell, in particular double-shell structure, and have two at least approximately radially extending plane walls 7 and 8 that are spaced apart from one another and that are produced form fiber reinforced composite material. A foam core 9 that keeps the two plate walls 7 and 8 at a distance and connects them to one another can likewise be introduced between these plate walls 7 and 8, with said foam core 9 advantageously being able to substantially completely fill the hollow space between the two plate walls 7 and 8. The foam core 9 of the guard plates 3 can be produced or formed analogously to the foam core 6 of the drum jacket 2.

As FIG. 1 further shows, the walls 4 and 5 or 7 and 8 of the drum jacket 2 or of the guard plates 3 of fiber reinforced composite material can have a wall thickness that is considerably smaller than the wall thickness of the foam core 6 or 9, for example less than 50% or less than 25% or also less than 10% of the wall thickness of the foam core.

As FIG. 1 further shows, the guard plates 3 can be produced separately from the drum jacket 2 and can be subsequently fastened to the drum jacket 2. The guard plates 3 can in particular be set against and fastened to the end faces of the drum jacket 2, with, as FIG. 1 shows, pull rods 10 being able to be used that can extend over the total length of the drum jacket 2 and also through the guard plates 3. The guard plates 3 can be axially tensioned against the drum jacket 2 by tensioning means at the end of the pull rods 10, for example in the form of nuts 11 screwed onto them.

Said pull rods 10 can advantageously extend through the drum jacket 2, in particular penetrate its form core 6.

Figure 2:
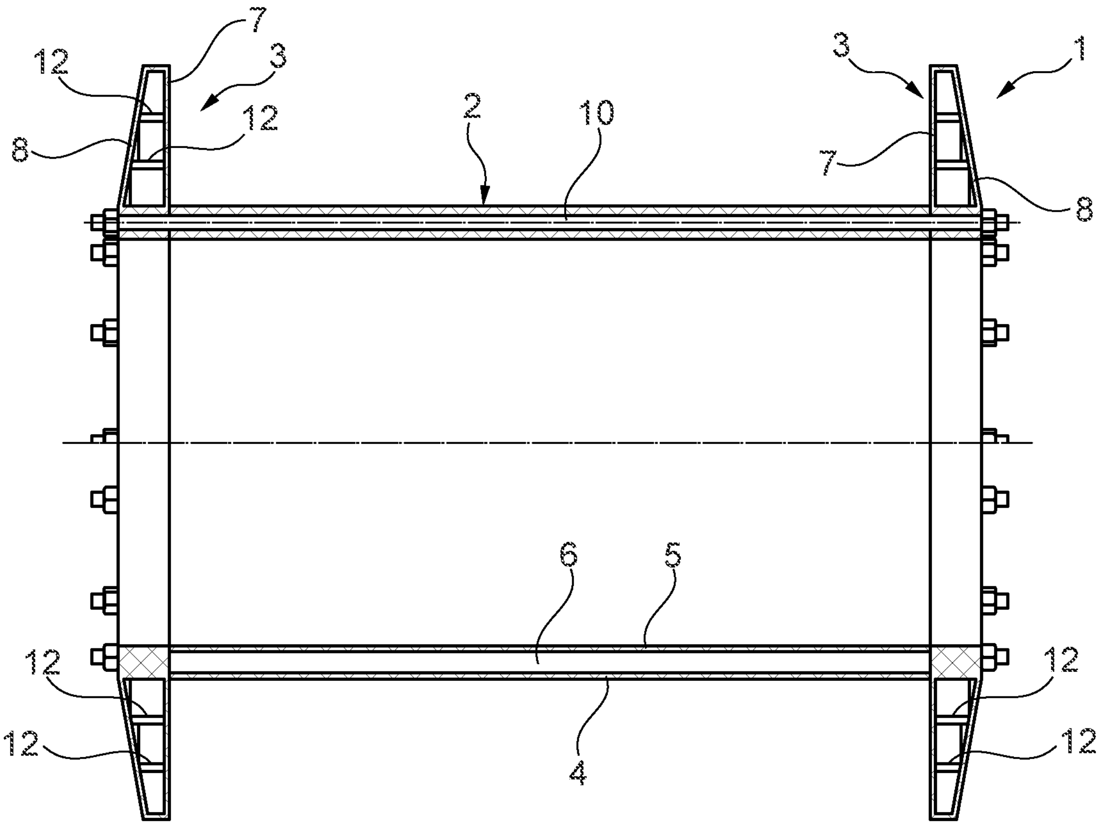
FIG. 2: a longitudinal section through a hoist drum similar to FIG. 1 in accordance with a further advantageous embodiment of the invention in which the drum jacket has in in a similar manner to FIG. 1 a two-shell structure having a foam core and the guard plates likewise have a two-shell structure, but with stiffening ribs.

As FIG. 2 shows, the drum jacket 2, on the one hand, and the guard plates 3, on the other hand, can have different designs or a different structure. Whereas in accordance with FIG. 2 the drum jacket 2 substantially has the two-shell structure with a foam core in accordance with FIG. 1, the guard plates 3 can be stiffened by stiffening ribs 12.

As FIG. 2 shows, the guard plates 3 can here in turn have a multi-shell structure having two plate walls 7 and 8 extending approximately radially and spaced apart from one another. A plurality of spiral or concentric or radial ribs 12 are provided between said plate walls 7 and 8 and connect the two approximately radially extending plate walls 7 and 8 to one another. Said stiffening ribs 12 project from the plate wall 7 that bounds the winding space above the drum jacket 2 outwardly in the axial direction until they reach the second plate wall 8.

As FIG. 2 shows, the stiffening ribs 12 can connect the two plate walls 7 and 8 to one another without a foam core. It would, however, alternatively also be possible also to foam the remaining intermediate space or to fill it with a foam core 6 in addition to the stiffening ribs 12.

Figure 3:
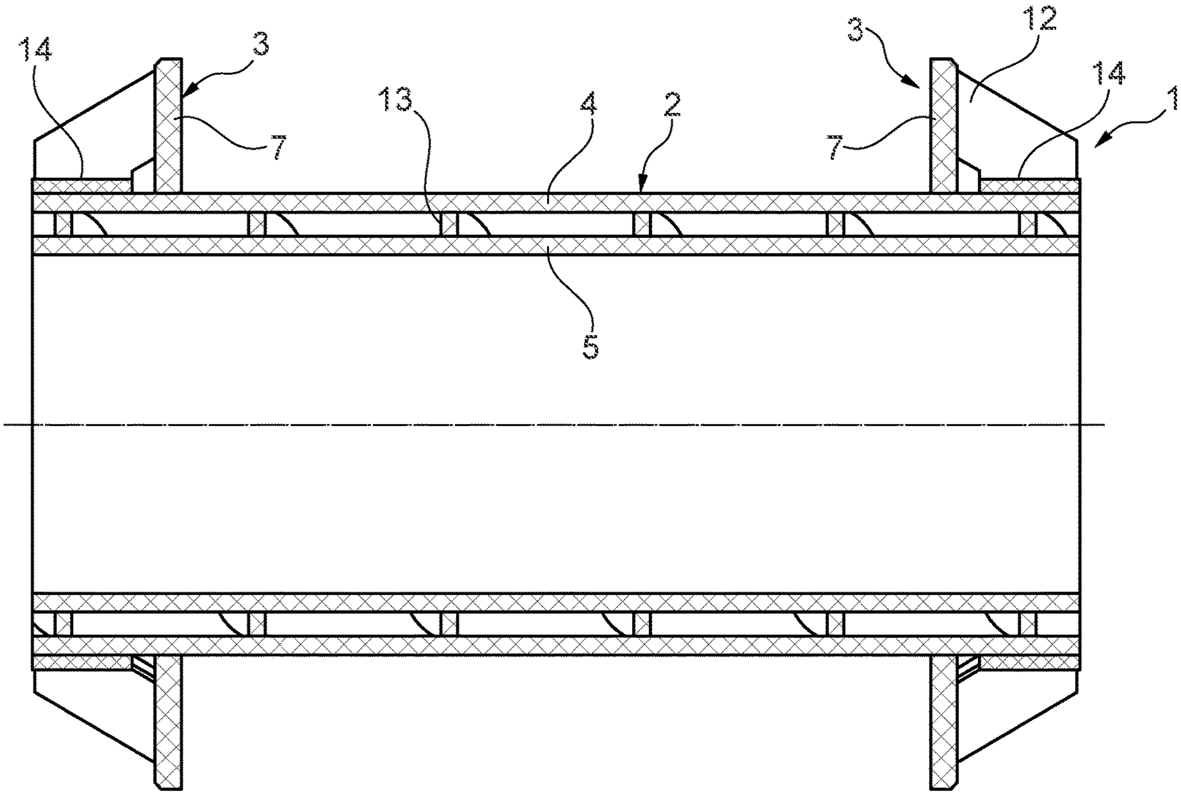
FIG. 3: a longitudinal section through a hoist drum in accordance with a further advantageous embodiment of the invention in which the drum jacket is formed in a two-shell manner with spiral stiffening ribs between the two jacket walls and the guard plates are pushed onto the drum jacket in the manner of a sleeve and are fixed there.

As FIG. 3 shows, the drum jacket 2 of the hoist drum 1 can also have a multi-shell structure with one or more stiffening ribs between material walls 4 and 5. In the embodiment shown in FIG. 3, a spiral or helical stiffening rib 13 that extends helically around the drum axis L or extends along the inner jacket surface and the outer jacket surface of the two jacket walls 4 and 5 is provided between the material walls 4 and 5 of the drum jacket 2. The stiffening rib 13 here advantageously extends substantially over the total length of the drum jacket 2.

As FIG. 3 shows, only the at least one stiffening rib 13 can also be provided between the two jacket walls 4 and 5 in the drum jacket 2. Alternatively to this, the stiffening rib 13 can, however, also be combined with a foam core 6 that fills the remaining intermediate spaces between the two jacket walls 4 and 5.

Figure 5:
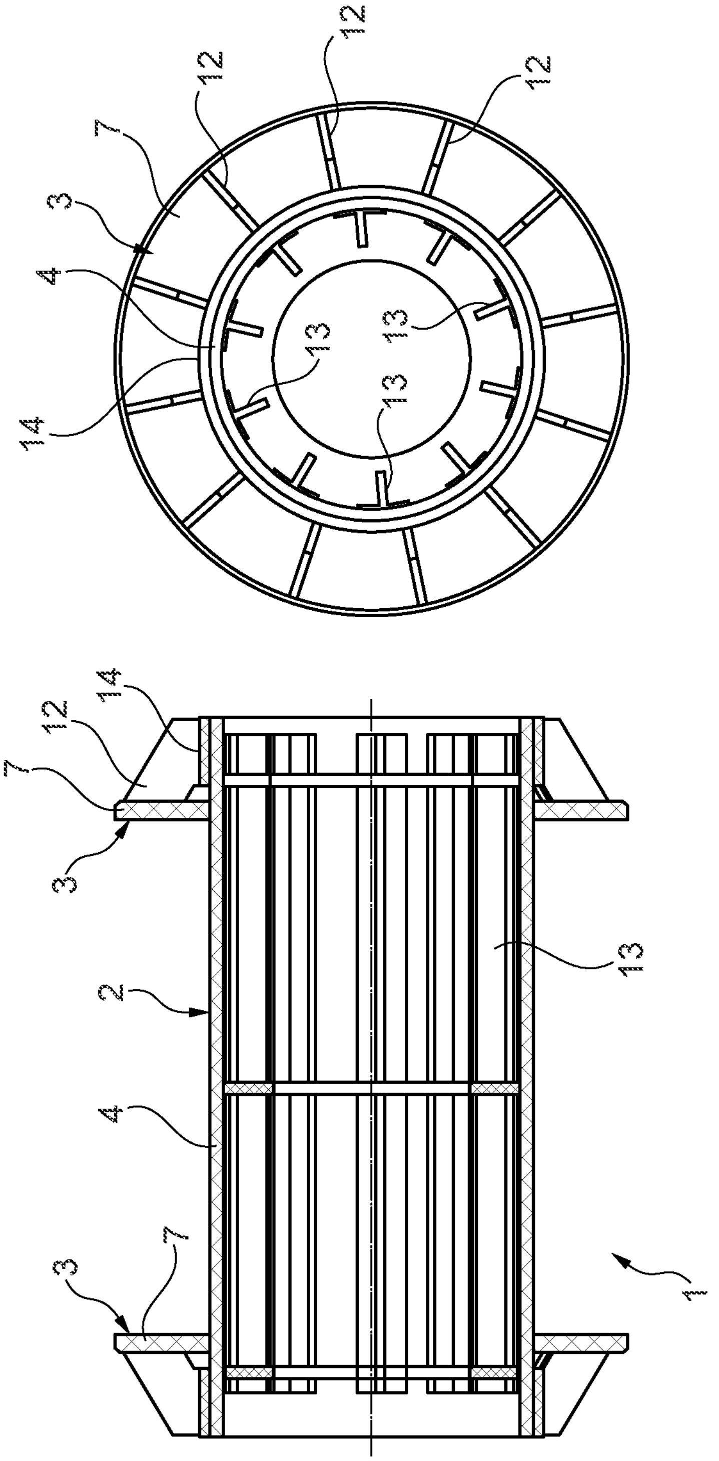
FIG. 5: a longitudinal section through a hoist drum in accordance with a further embodiment of the invention, with the drum jacket having a plurality of longitudinal ribs distributed over the periphery at its inner jacket side.

As FIG. 5 shows, the drum jacket 2 can, however, also be stiffened by stiffening ribs of a different contouring, in particular with a plurality of axial stiffening ribs 13 that can extend substantially in parallel with the longitudinal axis L of the drum jacket 2 at an inner side of the jacket wall 4. In this respect, FIG. 5 shows a single-shell structure of the drum jacket 2 that in this case only has a material wall 4 of fiber reinforced composite material. The axial stiffening ribs 13 shown in FIG. 5 can nevertheless also be used in a multi-shell structure of the drum jacket 2 and can then extend between two mutually spaced apart jacket walls 4 and 5 and can connect them to one another.

Stiffening ribs are not shown separately that can extend coaxially, that is substantially in the peripheral direction of the drum jacket 2, and that can advantageously be arranged distributed in the direction of the longitudinal axis L.

Figure 4:
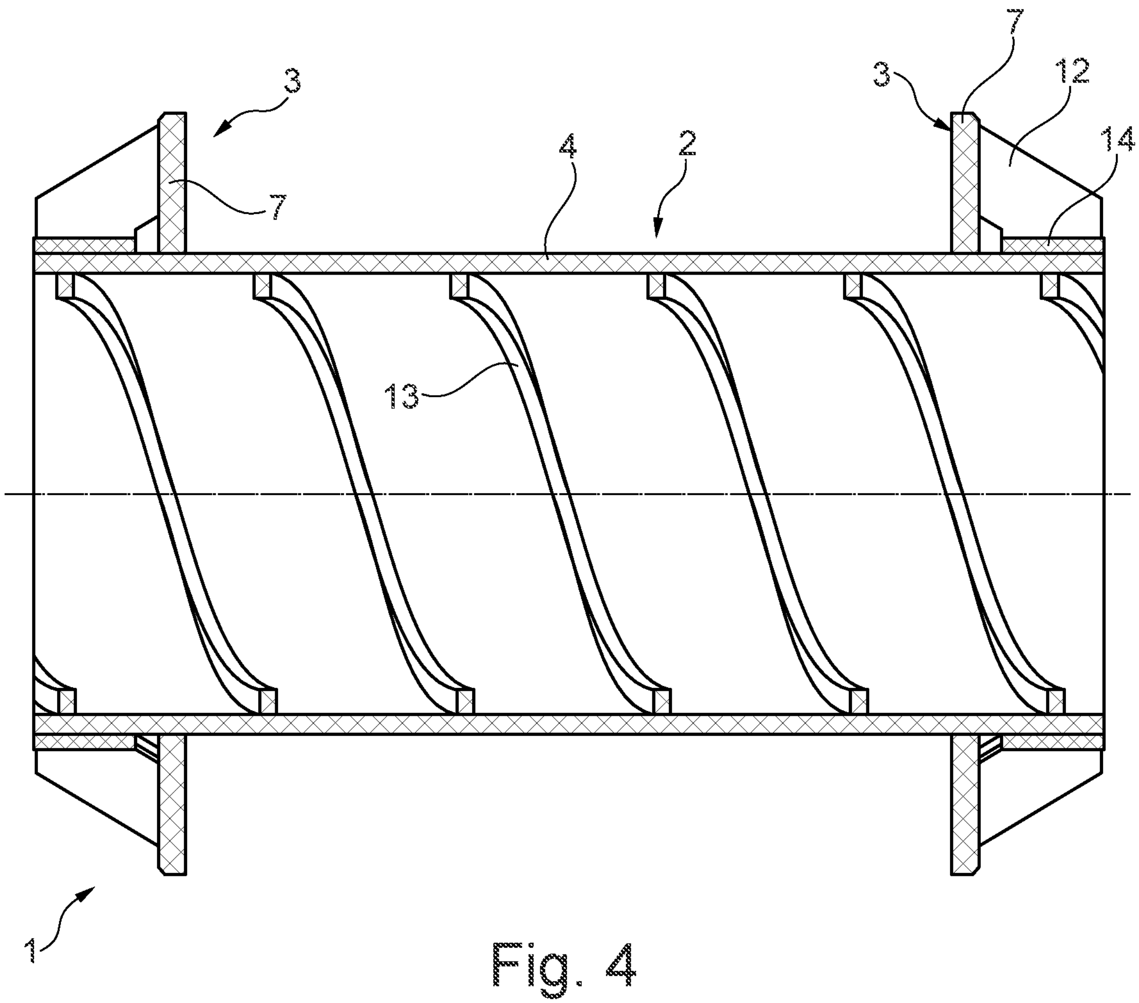
FIG. 4: a longitudinal section through a hoist drum in accordance with a further advantageous embodiment of the invention in which the drum jacket is formed with one wall and has spiral stiffening ribs at its inner material side.

As FIG. 4 further shows, a single-shell drum jacket 2 can also be stiffened by a helical stiffening rib 13 or by a plurality of such helical stiffening ribs 13, with the at least one stiffening rib 13 being able to extend at an inner jacket side of the jacket wall 4 and being able to project therefrom inwardly toward the drum center, cf. FIG. 4.

As FIGS. 3 to 5 show, the separately formed guard plates 3 cannot only be tensioned axially toward the end faces of the drum jacket 2, but can also be pushed onto the periphery of the drum jacket 2 with an exact fir or can be seated on the outer periphery of the drum jacket 2 in the manner of a sleeve or cap.

The guard plates 3 can here have an at least approximately radially extending plate wall 7 and can have an approximately cylindrical sleeve section 14 that can sit on the drum jacket 2. The plate wall 7 can be connected to said sleeve section 14 by a plurality of stiffening ribs 12 that can, for example, extend in an axial direction and can be arranged approximately radially. The plate wall 7 and the sleeve section 14 are advantageously formed integrally in one piece with the stiffening ribs 12 and are each produced from a fiber reinforced composite material.

The guard plates 3 pushed onto the drum jacket 2 can be secured or fastened in different manners there. For example, said sleeve section 14 can be fixed for example adhered firmly, to the drum jacket 2 with material continuity or force transmission.

Figure 6:
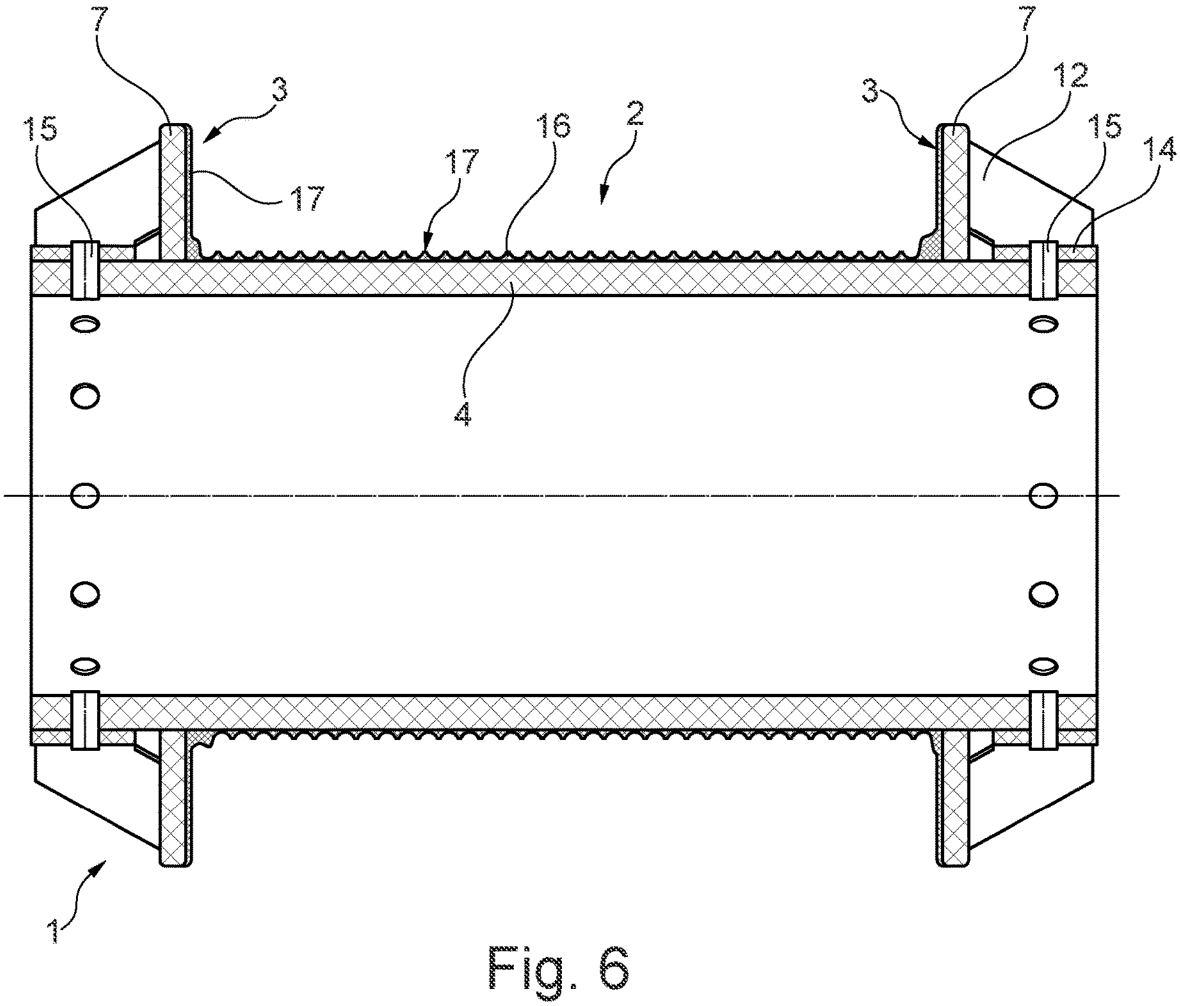
FIG. 6: a longitudinal section through a further hoist drum in which the guard plates are, in a similar manner to FIGS. 3 to 5, pushed onto the drum jacket and are secured by tensile bolts there, with a surface coating or jacketing that forms a grooving in the region of the drum jacket being provided on the outer jacket side of the drum jacket and the inner sides of the guard plates.

Alternatively or additionally to a connection with material continuity or force transmission, the pushed-on guard plates 3 at the drum jacket 2 can, however, also be secured or fixed with shape matching, in particular by one or more tensile bolts 15, as FIG. 6 shows, for example. Said tensile bolts 15 can extend through mutually aligned bores that can be formed in the sleeve section 14 of the guard plates 3 and the drum jacket 2.

As FIG. 6 further shows, the drum jacket 2 can be provided with a grooving 16 at the outer peripheral side to guide the rope running on. The grooving 16 can here be formed by a top layer or jacketing 17 that can be applied to the outer peripheral side of the drum jacket 2, in particular to the previously described jacket wall 4 of fiber reinforced composite material. The jacketing 17 forming the grooving 16 can here be produced from plastic, can be vulcanized on, for example, to achieve a certain damping and to reduce the wear of the rope to be wound on.

Alternatively or additionally, the guard plates 3 can also be provided with such a jacketing 17 as a top layer at least at the inner surface side, cf. FIG. 6.

Figure 7:
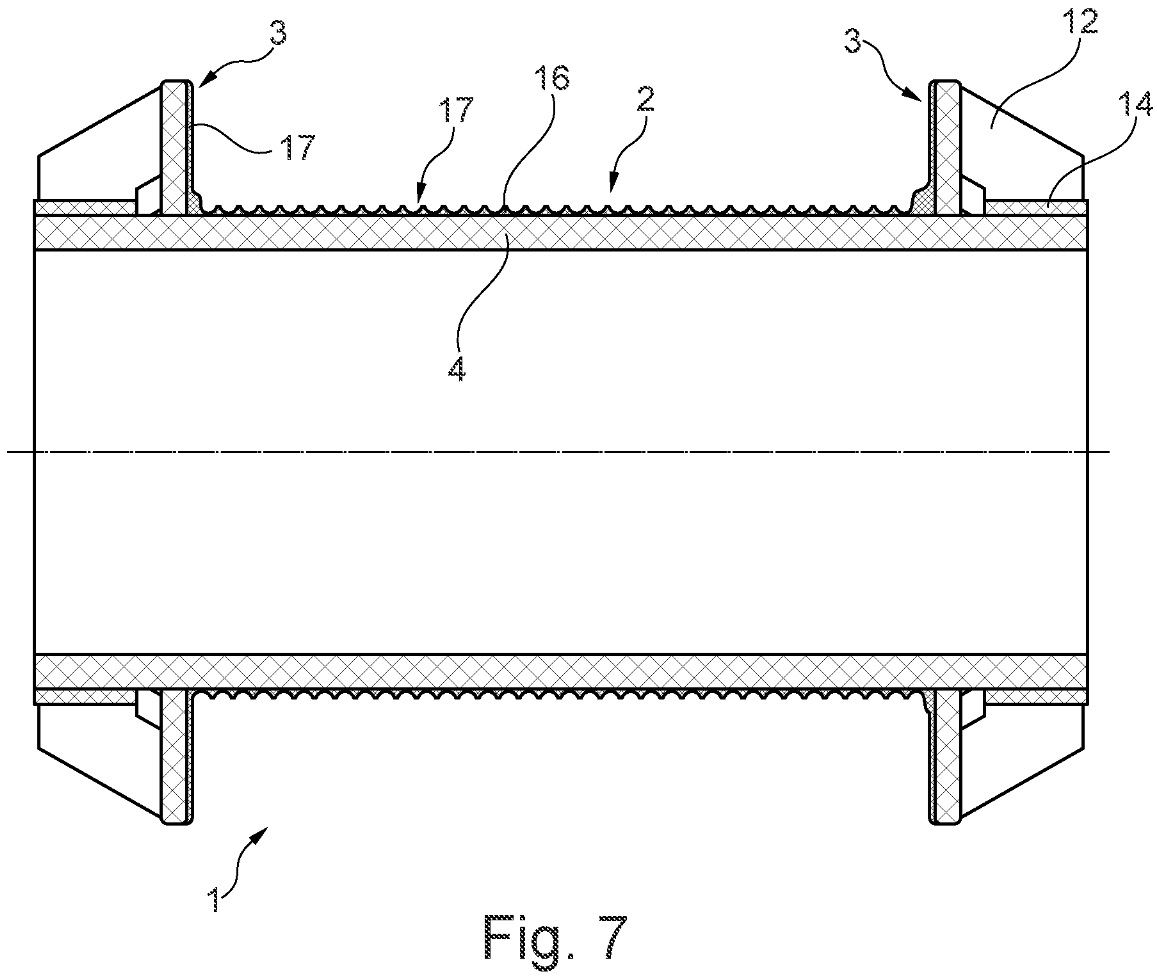
FIG. 7: a longitudinal section through a hoist drum similar to FIG. 6, with the guard plates being pushed onto the drum jacket and being connected or fixed with material continuity there.

While FIG. 6 in turn shows the bolting of the guard plates 3 to the drum jacket 2, the guard plates 3 can also be fastened to the drum jacket 2 with material continuity or with force transmission, as FIG. 7 shows. The sleeve section 14 of the respective guard plates 3 can, for example, be adhered to the drum jacket 2.

Figure 8:
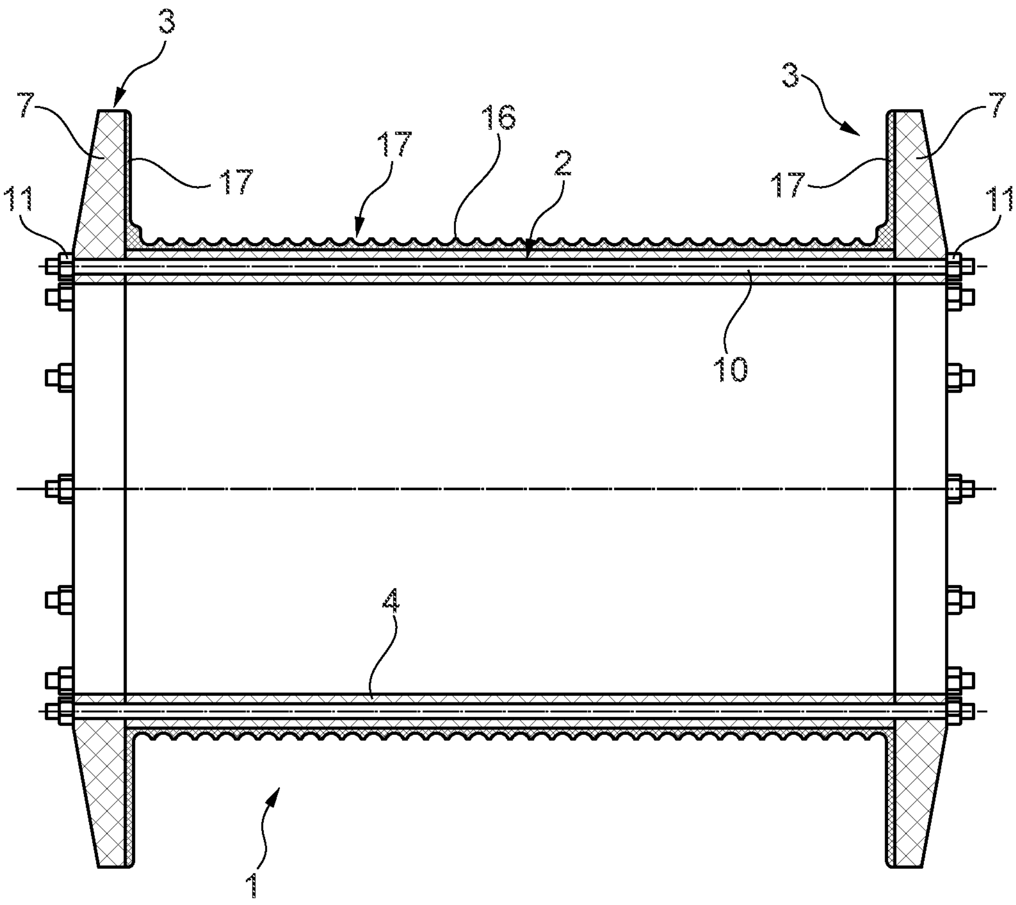
FIG. 8: a longitudinal section through a hoist drum similar to FIG. 7, with the separately formed guard plates being tensioned at the end faces toward the drum jacket wall by pull rods.

As FIG. 8 illustrates, the jacketing 17 or the groove 16 can also be combined with guard plates 3 that are tensioned or placed at the end face against the drum jacket 2 and are secured and fastened by pull rods 10.

Figure 9:
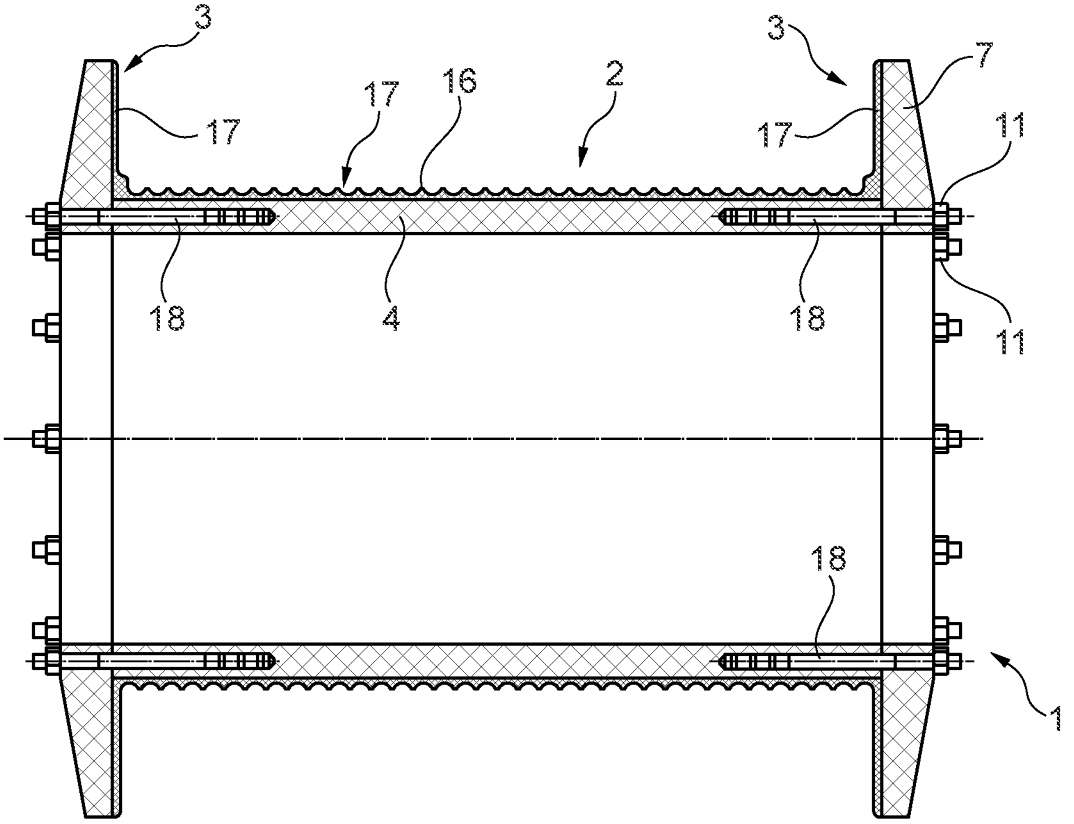
FIG. 9: a hoist drum similar to FIG. 7, with the separately formed guard plates being tautened against the end faces of the drum jacket by means of pull rods that are anchored in the drum jacket.

FIG. 9 shows a similar embodiment to FIG. 8, with tie rods 18 that are anchored in the drum jacket 2 and project therefrom at the end face to pass through the guard plates 3 being used to fasten the guard plates 3 instead of the continuous pull rods 10. The guard plates 3 can be drawn toward the end face of the drum jacket 2 via the tie rods 18 by tensioning means in the form of nuts 11 that can be screwed on, for example.

Said tie rods 18 are advantageously anchored in one of the jacket walls 4 or 5 of the drum jacket 2 of fiber reinforced composite material, with the tie rods 18 being able to be subsequently screwed thereto or also being able to be formed integrally in one piece thereat, for example in the form of projecting anchor bolts of fiber reinforced material or enveloped anchor bolts.

It must be clarified that such tie rods 18 can here also be used with drum jackets 2 formed with double shells or multiple shells, such as are shown, for example, in FIGS. 1 to 3, even if FIG. 9 only shows a single-shell drum jacket 2.

The same also applies to the grooving 16 or to the jacketing 17 and/or to the fastening of the guard plates 3 such as FIGS. 6 to 8 show. The jacketing 17 forming the grooving 16 can in particular also be used in the previously described embodiments in accordance with FIGS. 1 to 5. The jacketing 17 at the inner side of the guard plates 3 can also be used there.

Figure 10:
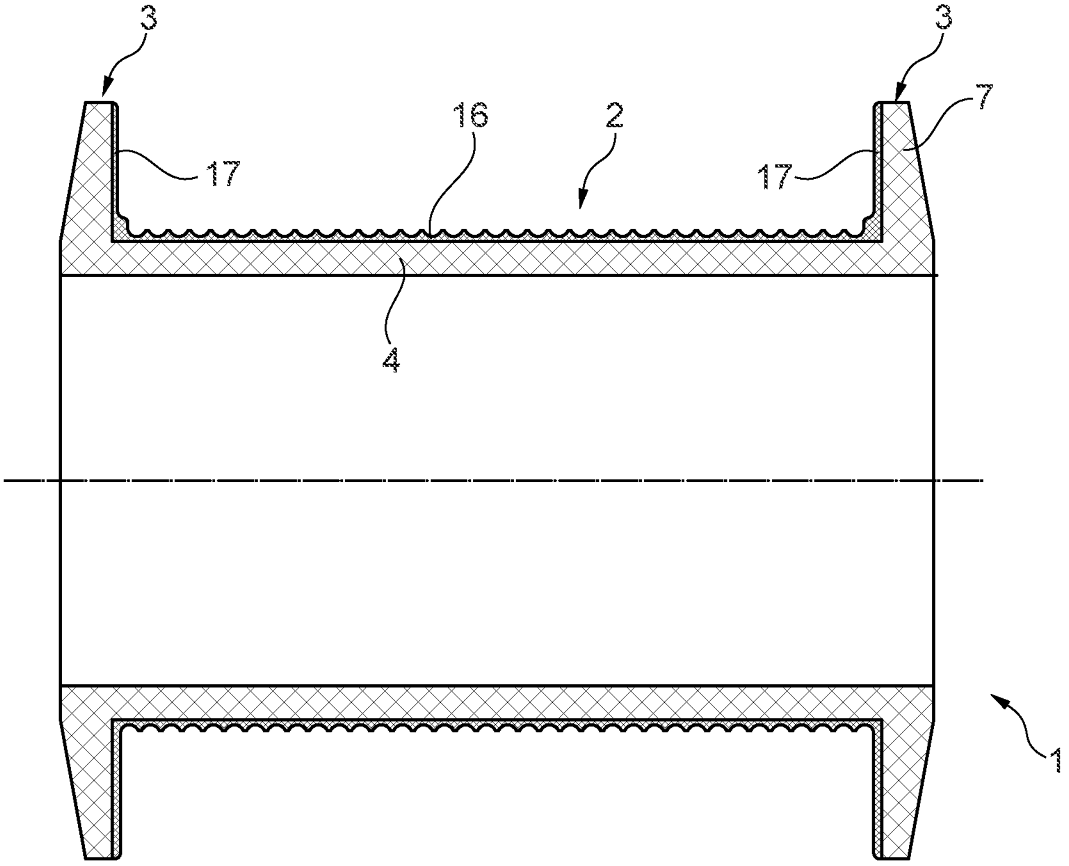
FIG. 10: a longitudinal section through a hoist drum similar to FIGS. 8 and 9, with the guard plates being connected to the drum jacket integrally in one piece and with material homogeneity.
Figure 11:
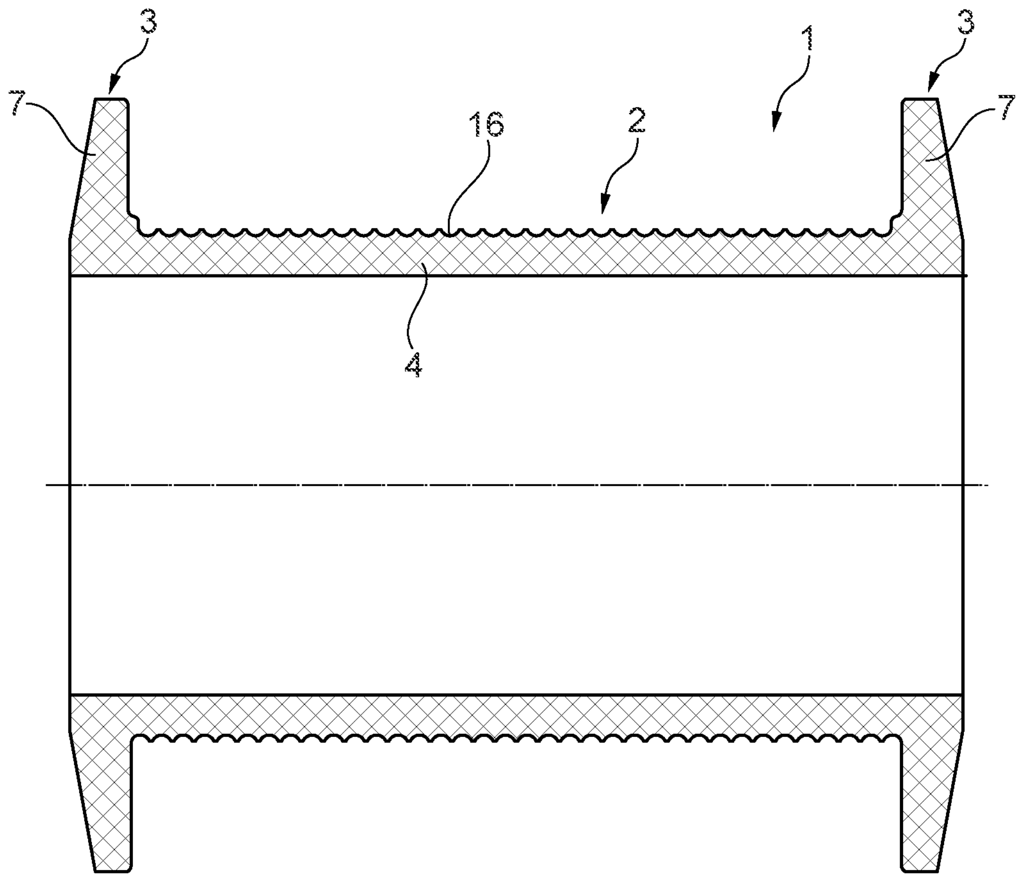
FIG. 11: a longitudinal section through a hoist drum similar to FIG. 10, with the rope grooving at the outer jacket surface being directly introduced in the fiber reinforced composite material of the drum jacket wall.

As FIGS. 10 and 11 show, the guard plates 3 can also be connected to the drum jacket 2 or can be molded thereto integrally in one piece, in particular with material homogeneity. This applies independently of the single-shell or single-wall structure of the drum jacket 2 or of the guard plates 3 shown in FIGS. 10 and 11 so that the multi-shell embodiment options in accordance with the previously described FIGS. 1 to 3 can also be formed with guard plates 3 molded integrally in one piece.

While FIG. 10 shows a grooving 16 that is formed by a subsequent coating or jacketing 17 on the outer side of the drum jacket 2, said grooving 16 can also be introduced directly into the fiber reinforced composite material of the drum jacket wall 4, cf. FIG. 11.

We claim:

1. A hoist drum for a hoist winch of a rope drive comprising:

a drum jacket; and two guard plates adjacent to the drum jacket at end sides, wherein the drum jacket and the two guard plates comprise a fiber reinforced composite material, wherein the drum jacket comprises two jacket walls and a longitudinal axis, wherein the drum jacket is reinforced by stiffening ribs, a foam core between the two jacket walls, and the fiber reinforced composite material, wherein the stiffening ribs extend between the two jacket walls and connect the two jacket walls to one another, wherein the stiffening ribs are formed in the foam core between the two jacket walls, wherein the stiffening ribs extend axially parallel to the longitudinal axis and/or are concentric and mutually spaced apart from the longitudinal axis, wherein at least one of the two jacket walls comprises the fiber reinforced composite material such that a main fiber direction of the fiber reinforced composite material of the at least one of the two jacket walls extends helically around the longitudinal axis, wherein each of the two guard plates comprises a multi-shell structure comprising two guard plate walls, wherein each of the two guard plates is reinforced by spiral stiffening ribs, a foam core between the two guard plate walls, and the fiber reinforced composite material, wherein the spiral stiffening ribs extend between the two guard plate walls of each of the two guard plates and connect the two guard plate walls of each of the two guard plates to one another, wherein the spiral stiffening ribs between the two guard plate walls of each of the two guard plates are integrally formed with the two guard plate walls of each of the two guard plates in a wet-on-wet manner, wherein the two guard plate walls of each of the two guard plates and the spiral stiffening ribs comprise the fiber reinforced composite material, wherein the two guard plates are formed separately from the drum jacket and are fastened to the drum jacket by pull rods that extend through the total length of the drum jacket and through the two guard plates, wherein the pull rods extend through the drum jacket and penetrate the foam core of the drum jacket, wherein the pull rods penetrate the foam core of at least one of the two guard plates.

2. The hoist drum of claim 1, wherein the two guard plate walls of each of the two guard plates each has a wall thickness that is less than 50% of the wall thickness of the foam core between the two guard plate walls of each of the two guard plates.

3. The hoist drum of claim 1, wherein the two guard plate walls of each of the two guard plates each has a wall thickness that is less than 25% of the wall thickness of the foam core between the two guard plate walls of each of the two guard plates.

4. The hoist drum of claim 1, wherein the foam core between the two jacket walls is foamed as a full carcass from a closed cell hard foam, wherein the closed cell hard foam comprises at least one of polyurethane foam, polystyrene foam, or polyvinylchloride foam, and completely fills a space between the two jacket walls.

5. The hoist drum of claim 1, wherein the stiffening ribs comprise the fiber reinforced composite material and extend axially parallel to the longitudinal axis from one of the two guard plate walls of one of the two guard plates toward one of the two guard plate walls of the other of the two guard plates, wherein the one of the two guard plate walls of the one of the two guard plates and the one of the two guard plate walls of the other of the two guard plates are on opposite ends of the drum jacket.

6. The hoist drum of claim 1, wherein the stiffening ribs extend helically along an inner jacket space between the two jacket walls and/or about the longitudinal axis of the drum jacket to stiffen the drum jacket.

7. The hoist drum of claim 1, wherein the stiffening ribs extend along an end face of at least one of the two guard plate walls spirally or concentrically about the longitudinal axis of the drum jacket.

8. The hoist drum of claim 1, wherein at least one of the stiffening ribs has a rib height from 50% to 250% of a wall thickness of at least one of the two jacket walls.

9. The hoist drum of claim 1, wherein at least one of the stiffening ribs has a rib height from 75% to 125% of a wall thickness of at least one of the two jacket walls.

10. The hoist drum of claim 1, wherein the fiber reinforced composite material of the at least one of the two jacket walls comprises a multilayer fiber reinforcement comprising different fiber reinforcement layers.

11. The hoist drum of claim 10, wherein the multilayer fiber reinforcement has different main directions in the different fiber reinforcement layers.

12. The hoist drum of claim 1, wherein the main fiber direction of the fiber reinforced composite material of the at least one of the two jacket walls extends helically around the longitudinal axis of the drum jacket in multiple layers in cross-coating with oppositely running helical pitches.

13. The hoist drum of claim 1, wherein the drum jacket has a grooving directly in the fiber reinforced composite material of the drum jacket.

14. The hoist drum of claim 1, wherein the drum jacket comprises a jacketing that has a grooving, wherein the jacketing is vulcanized onto the fiber reinforced composite material.

15. The hoist drum of claim 1, wherein the two guard plates comprise a jacketing applied in a vulcanized fashion onto the fiber reinforced composite material.

16. The hoist drum of claim 1, wherein the two guard plates are molded integrally in one piece with material homogeneity to the drum jacket, wherein the fiber reinforced composite material extends continuously beyond a transition region between the drum jacket and each of the two guard plates.

17. The hoist drum of claim 1, wherein the two guard plates are formed separately from the drum jacket and are subsequently connected to the drum jacket.

18. The hoist drum of claim 17, wherein the two guard plates are set at end faces of the drum jacket and are tensioned toward the end faces of the drum jacket by the pull rods or tie rods.

19. The hoist drum of claim 18, wherein the tie rods extend through the foam core of the drum jacket and/or the tie rods are anchored in a material jacket of fiber reinforced composite material.

20. The hoist drum of claim 1, wherein the two guard plates are seated in a sleeve-like or cap-like manner on the drum jacket.

21. A method of producing the hoist drum of claim 1, the method comprising:

producing the drum jacket from the fiber reinforced composite material, wherein the drum jacket is built up by winding the fiber reinforced composite material;

saturating the fiber reinforced composite material before or after the winding with a matrix material; and hardening the matrix material after the winding.

22. The method of claim 21, further comprising:

forming the two guard plates from the fiber reinforced composite material; and foaming an intermediate space between the two guard plate walls of each of the two guard plates.

23. The hoist drum of claim 1, wherein the two jacket walls comprise the fiber reinforced composite material or wherein the two jacket walls comprise the fiber reinforced composite material such that the main fiber direction of the fiber reinforced composite material of the two jacket walls extends helically around the longitudinal axis.

24. The hoist drum of claim 1, wherein the stiffening ribs extend axially parallel to the longitudinal axis and are concentric and mutually spaced apart from the longitudinal axis.

25. The hoist drum of claim 1, wherein the hoist winch is configured to lift a load such that a lifting direction is perpendicular to the longitudinal axis during lifting.

26. The hoist drum of claim 25, wherein the stiffening ribs extend along an end face of at least one of the two guard plate walls spirally or concentrically about the longitudinal axis of the drum jacket.

27. A crane comprising a hoist drum, wherein the hoist drum comprises: a drum jacket; and two guard plates adjacent to the drum jacket at end sides, wherein the drum jacket and the two guard plates comprise a fiber reinforced composite material, wherein the drum jacket comprises two jacket walls and a longitudinal axis, wherein the drum jacket is reinforced by stiffening ribs, a foam core between the two jacket walls, and the fiber reinforced composite material, wherein the stiffening ribs extend between the two jacket walls and connect the two jacket walls to one another, wherein the stiffening ribs are formed in the foam core between the two jacket walls, wherein the stiffening ribs extend axially parallel to the longitudinal axis and/or are concentric and mutually spaced apart from the longitudinal axis, wherein at least one of the two jacket walls comprises the fiber reinforced composite material such that a main fiber direction of the fiber reinforced composite material of the at least one of the two jacket walls extends helically around the longitudinal axis, wherein each of the two guard plates comprises a multi-shell structure comprising two guard plate walls, wherein each of the two guard plates is reinforced by spiral stiffening ribs, a foam core between the two guard plate walls, and the fiber reinforced composite material, wherein the spiral stiffening ribs extend between the two guard plate walls of each of the two guard plates and connect the two guard plate walls of each of the two guard plates to one another, wherein the spiral stiffening ribs between the two guard plate walls of each of the two guard plates are integrally formed with the two guard plate walls of each of the two guard plates in a wet-on-wet manner, wherein the two guard plate walls of each of the two guard plates and the spiral stiffening ribs comprise the fiber reinforced composite material, wherein the two guard plates are formed separately from the drum jacket and are fastened to the drum jacket by pull rods that extend through the total length of the drum jacket and through the two guard plates, wherein the pull rods extend through the drum jacket and penetrate the foam core of the drum jacket, wherein the pull rods penetrate the foam core of at least one of the two guard plates.

* * * * *